United States Patent
Wang et al.

(10) Patent No.: US 12,131,655 B2
(45) Date of Patent: Oct. 29, 2024

(54) METHOD AND DEVICE FOR GENERATING FLIGHT RESTRICTION ZONE, AND METHOD AND DEVICE FOR CONTROLLING FLIGHT OF UNMANNED AERIAL VEHICLE

(71) Applicant: SZ DJI TECHNOLOGY CO., LTD., Shenzhen (CN)

(72) Inventors: Shu Wang, Shenzhen (CN); Brendan Schulman, Shenzhen (CN); Ruiyi Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 690 days.

(21) Appl. No.: 17/233,449

(22) Filed: Apr. 17, 2021

(65) Prior Publication Data
US 2021/0256857 A1    Aug. 19, 2021

Related U.S. Application Data

(63) Continuation of application No. PCT/CN2018/110862, filed on Oct. 18, 2018.

(51) Int. Cl.
*G08G 5/00* (2006.01)
*B64C 39/02* (2023.01)

(52) U.S. Cl.
CPC .......... *G08G 5/0069* (2013.01); *B64C 39/024* (2013.01); *G08G 5/0013* (2013.01); *G08G 5/006* (2013.01); *B64U 2201/10* (2023.01)

(58) Field of Classification Search
CPC .... G08G 5/0069; G08G 5/0013; G08G 5/006; B64C 39/024; B64U 2201/10
See application file for complete search history.

(56) References Cited

U.S. PATENT DOCUMENTS

| 2015/0254988 A1* | 9/2015 | Wang | ................... B64C 39/024 |
| | | | 701/3 |
| 2015/0339931 A1* | 11/2015 | Yu | .......................... G08G 5/006 |
| | | | 701/122 |
| 2016/0225264 A1* | 8/2016 | Taveira | ................ G08G 5/0013 |

(Continued)

FOREIGN PATENT DOCUMENTS

| CN | 104809918 A | 7/2015 |
| CN | 104932525 A | 9/2015 |

(Continued)

OTHER PUBLICATIONS

The World Intellectual Property Organization (WIPO) International Search Report for PCT/CN2018/110862 Jun. 27, 2019 6 pages.

*Primary Examiner* — Yazan A Soofi
*Assistant Examiner* — Naeem Taslim Alam
(74) *Attorney, Agent, or Firm* — ANOVA LAW GROUP, PLLC

(57) ABSTRACT

A method for controlling flight of an unmanned aerial vehicle, includes receiving a data file indicating flight restriction level and range of an airport area in an airport generated according to a risk level of the airport, parsing the data file to obtain the flight restriction level and the range of the airport area, and controlling the unmanned aerial vehicle to execute a flight restriction strategy according to the flight restriction level and the range of the airport area.

17 Claims, 4 Drawing Sheets

(56) References Cited

U.S. PATENT DOCUMENTS

2016/0253907 A1    9/2016  Taveira
2017/0076610 A1*   3/2017  Liu ...................... H04W 4/021

FOREIGN PATENT DOCUMENTS

| CN | 105280025 | A | 1/2016 | | |
|----|-----------|---|--------|---|---|
| CN | 106461396 | A | 2/2017 | | |
| CN | 107180561 | A | 9/2017 | | |
| CN | 107209519 | A | 9/2017 | | |
| CN | 107507462 | A | 12/2017 | | |
| CN | 107615357 | A | 1/2018 | | |
| CN | 108351645 | A | 7/2018 | | |
| CN | 108369782 | A | 8/2018 | | |
| WO | WO-2017084031 | A1 * | 5/2017 | ............. | G05D 1/106 |

* cited by examiner

■ No-fly zone ▨ Authorization zone ▧ Altitude-restricted zone ▨ Altitude-restricted zone ░ Enhanced warning zone

METHOD AND DEVICE FOR GENERATING FLIGHT RESTRICTION ZONE, AND METHOD AND DEVICE FOR CONTROLLING FLIGHT OF UNMANNED AERIAL VEHICLE

CROSS-REFERENCE TO RELATED APPLICATION

This application is a continuation of International Application No. PCT/CN2018/110862, filed Oct. 18, 2018, the entire content of which is incorporated herein by reference.

TECHNICAL FIELD

The present disclosure relates to the field of unmanned aerial vehicle control and, in particular, to a method and device for generating a flight restriction zone, a method and device for controlling flight of an unmanned aerial vehicle, and a control method and device for an unmanned aerial vehicle.

BACKGROUND

To ensure flight safety of aircrafts, there are rules for flight of the aircrafts, for example, unmanned aerial vehicles (UAVs), in airport areas. For example, all UAV flights are prohibited within a certain distance of the airports. Two types of existing airport flight restriction zones are a circular flight restriction zone to cover the airport or runways, and a polygonal flight restriction zone with a wide range of no-fly zone. The airport-types flight restriction zones usually include a circular no-fly zone drawn and stacked with an authorization zone and a warning zone. However, such solutions do not really eliminate a risk of flight near the airport with following reasons.

First, the circular flight restriction zone does not eliminate a risk of interference with airport operations completely. For a large aircraft, there is a great range and altitude requirement for take-off, landing, and hovering. Such requirements are not taken into consideration in the existing airport flight restriction zones, which can still affect the aircraft take-off and landing or cause panic and pressure on pilots when the aircraft takes off outside the no-fly zone.

Second, a large amount of space on both sides of the runway is occupied by the circular no-fly zone, which in fact has minimal interference with the airport operations and take-off, landing, and hovering of the aircrafts, but greatly restricts the flight range of a UAV.

Third, the use of the polygonal restriction zone with a wide range of no-fly zone also affects normal operation space of a UAV, which is not conducive to development of industry.

The protection range of the existing no-fly zone is either too small to effectively protect the airport, or too large to greatly affect the use of a UAV. Therefore, to improve the use of a UAV and facilitate the development of the industry under the premise of ensuring the safety of the airport operations, existing flight restriction strategy needs to be improved.

SUMMARY

In accordance with the disclosure, there is provided a method for controlling flight of an unmanned aerial vehicle. The method includes receiving a data file indicating flight restriction level and range of an airport area in an airport generated according to a risk level of the airport, parsing the data file to obtain the flight restriction level and the range of the airport area, and controlling the unmanned aerial vehicle to execute a flight restriction strategy according to the flight restriction level and the range of the airport area.

Also in accordance with the disclosure, there is provided a device for controlling an unmanned aerial vehicle, including a memory storing a computer program and a processor. The processor is configured to execute the computer program to receive a data file indicating flight restriction level and range of an airport area in an airport generated according to a risk level of the airport, parse the data file to obtain the flight restriction level and the range of the airport area, and control the unmanned aerial vehicle to execute a flight restriction strategy according to the flight restriction level and the range of the airport area.

DETAILED DESCRIPTION OF THE EMBODIMENTS

Technical solutions of the present disclosure will be described with reference to the drawings. It will be appreciated that the described embodiments are part rather than all of the embodiments of the present disclosure. Other embodiments conceived by those having ordinary skills in the art on the basis of the described embodiments without inventive efforts should fall within the scope of the present disclosure.

In the description below, a large number of specific details are given to provide a more thorough understanding of the present disclosure. It will be appreciated to those skilled in the art that the present disclosure can be implemented without one or more of these details. In some examples, to avoid confusion with the present disclosure, some technical features known by those skilled in the art are not described. The present disclosure can be implemented in different forms and should not be limited to the embodiments below.

The terms used here are for descriptive purposes only and should not be understood as limitations of the present disclosure. In the description of the present disclosure, the terms "one," "a/an," and "said/the" do not specifically refer to the singular but also include the plural, unless otherwise specified. The terms "include," "contain," and any other variants are intended to cover non-exclusive inclusion, i.e., a process, method, article, or device including a series of elements not only includes the listed elements, but also includes other elements that are not explicitly listed, or elements inherent to the process, method, article, or device. The term "and/or" includes any and all combinations of the items listed.

To fully understand the present disclosure, detailed processes and detailed structures will be described below to explain the technical solutions consistent with the present disclosure.

As described above, many of the existing airport flight restriction zones are circular areas with the airport runways or airport ground targets as the core. But such protection methods only protect operation facilities of the airport ground targets rather than effectively protect the take-off and landing range of large aircrafts. In fact, take-off and landing are riskier in air operations. One or more pilots are also prone to fear when they see foreign objects during the flight. Based on this, the existing flight restriction strategy is improved in the present disclosure, in which the protection requirements of the airport operations and using needs of a user of an unmanned aerial vehicle (UAV) are fully considered to solve a conflict between the airport operation protection and the use of a UAV to a certain extent. A method for generating a flight restriction zone according to embodiments of the present disclosure is described with reference to FIG. 1A to FIG. 3C.

Figure 1A:
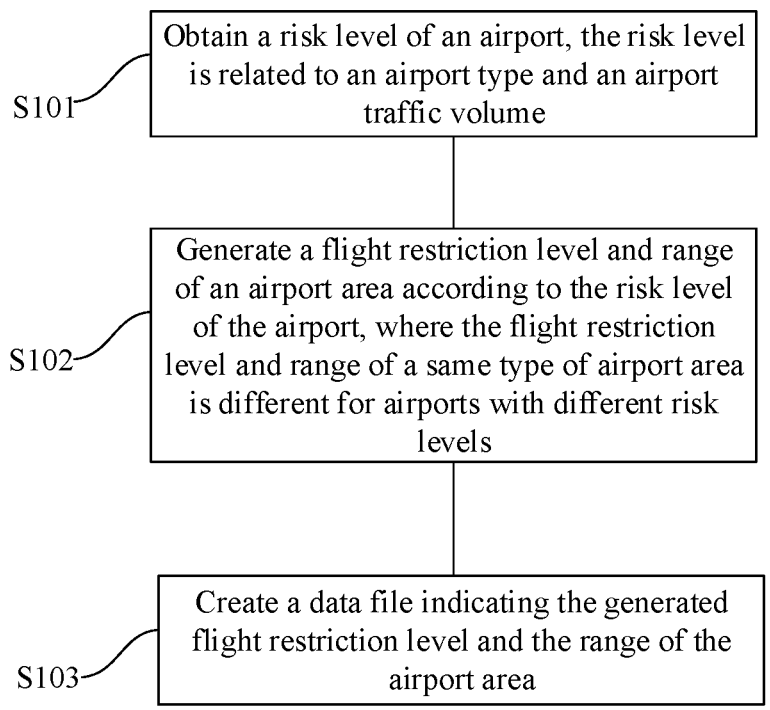
FIG. 1A is a schematic flow chart of a method for generating a flight restriction zone according to an example embodiment.

FIG. 1A is a schematic flow chart of a method for generating a flight restriction zone according to an example embodiment. As shown in FIG. 1A, the method for generating a flight restriction zone includes following processes.

At S101, a risk level of an airport is obtained, where the risk level is related to an airport type and an airport traffic volume of the airport.

At S102, a flight restriction level and range of an airport area is generated according to the risk level of the airport, where the flight restriction level and the range of a same type of airport area is different for airports with different risk levels.

At S103, a data file indicating the generated flight restriction level and the range of the airport area is created.

The airport type and the airport traffic volume are closely related to the risk level of the airport. For example, the larger the airport traffic volume, the higher the risk level. In an example embodiment, the risk level of the airport includes high risk, medium risk, and low risk. The high risk indicates a greater risk of the airport and that a UAV at or near the airport is more likely to interfere with airport operations. Correspondingly, the low risk indicates that the airport is less risky and a UAV at or near the airport is less likely to interfere with the airport operations. The medium risk indicates a level of risk between the high risk and the low risk. A classification of airport risk levels is not limited to a three-level classification of high risk, medium risk, and low risk. For example, the classification may be a two-level classification include only high risk and low risk or may be a classification including more levels. The risk level can also be related another parameter in addition to the airport type and the airport traffic volume, which is not limited here.

The risk level of the airport can be artificially determined according to information, such as the airport type and the airport traffic volume, etc., or be determined by a program or software according to the information, such as the airport type and the traffic volume, etc.

Further, obtaining the risk level of the airport can also include obtaining airport geographic coordinate information and determining the airport type and the airport traffic volume, etc., through the airport geographic coordinate information to determine the risk level of the airport.

Because there are various airport types, and the airport traffic volumes are completely different for different airports, if all airports adopt the same flight restriction strategy, the protection requirements of the airport operations and the using needs of a user cannot be fully taken into consideration by each airport, which is not conducive to the use of a UAV and the protection of the airport operations. Therefore, in an example embodiment, the flight restriction level and the range of the airport area is generated according to the risk level of the airport according to the existing flight restriction strategy. Specifically, for an airport with high risk level, the airport area is set with a relatively high flight restriction level and the range. For an airport with the low risk level, the airport area is set with a relatively low flight restriction level and the range. Therefore, the safety of the airport operation is ensured, the use of a UAV and convenience are improved.

In an example embodiment, the flight restriction level from low to high include a warning zone, an enhanced warning zone, an authorization zone, an altitude-restricted zone, and a no-fly zones. The warning zone and the enhanced warning zone refer to areas where a UAV may receive a risk alert during flying. The authorization zone refers to an area where a UAV needs to fly with authorization. The altitude-restricted zone refers to an area where a UAV cannot fly beyond a set altitude threshold, and the altitude threshold of the altitude-restricted zone is an altitude from a horizontal plane at which the airport runway is located or the altitude from a take-off point of a UAV. The no-fly zone refers to an area where all UAV flights are prohibited.

The data file may be created in a set format. The data file may be created after a flight restriction zone of the airport is generated, or after several or all flight restriction zones of the airport are generated.

Generating the flight restriction level and the range of the airport area according to the risk level of the airport consistent with the embodiments of the present disclosure is described below with reference to FIG. 2 to FIG. 3C.

First, as described above, the protection range of the existing solution with a circular flight restriction zone taking the airport runway the core is either too small to effectively protect the airport, or too large to greatly affect the use of a UAV. Therefore, in an example embodiment, the flight restriction zone includes a polygonal flight restriction zone. The polygonal flight restriction zone covers a plurality of areas, such as an airport runway area, an approaching surface, a re-flying surface, and an inner horizontal surface, etc., which includes a required range and altitude of the airport for aircraft take-off, landing, and hovering, and does not take up too much of the outer space on both sides of the airport runway. Second, different flight restriction levels are set for different areas of the polygonal flight restriction zone according to the risk level of the airport. Therefore, the protection requirements of the airport operation and the using needs of the user are balanced.

Figure 2:
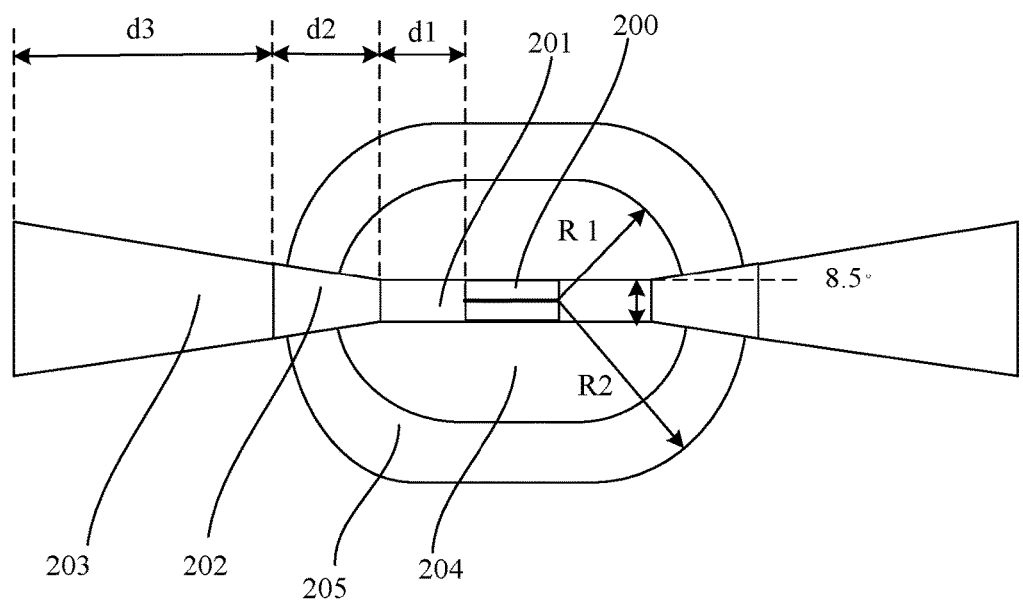
FIG. 2 is a schematic diagram showing division of an airport area according to an example embodiment.

FIG. 2 is a schematic diagram showing a division of an airport area according to an example embodiment. In an example embodiment, the areas within the airport which require flight controlling include a first area, a second area, a third area, a fourth area, and a fifth area.

As shown in FIG. 2, the first area includes an airport runway 200 and runway extensions 201. The runway extensions 201 include areas extending from two ends of the airport runway 200 outwards by a set distance of d1 along a direction of the airport runway 200 (i.e., an extension direction of the airport runway 200). For example, d1 is 3 km. That is, the runway extensions 201 include areas extending from two ends of the airport runway 200 outwards by 3 km along the direction of the airport runway 200. The direction of the airport runway refers to an extension direction of the airport runway 200. The runway extension 201 is a part of the approaching surface and re-flying surface of the airport.

The second area includes first trapezoidal areas 202 connected to two ends of the first area and extending along the direction of the airport runway 200. The first trapezoidal areas 202 include areas extending from two ends of the first area outwards by a set distance of d2. For example, d2 is 3.6 km. For example, an angle between two sides (waists) of the first trapezoidal area 202 and the airport runway 200 is 8.5 degrees.

The third area includes second trapezoidal areas 203 connected to the second area and extending along the direction of the airport runway 200. The second trapezoidal areas 203 include areas extending from two ends of the second area outwards by a set distance of d3. For example, d3 is 8.4 km. For example, an angle between the two sides (waist) of the second trapezoidal area 203 and the airport runway 200 is 8.5 degrees.

The fourth area includes areas of a first sport-field-shaped area surrounding the airport runway 200 that do not intersect the first area and the second area. The first sport-field-shaped area includes an area obtained by drawing two arcs with midpoints of two ends of the airport runway 200 as centers of circles, respectively, and a first radius R1, and then connecting the two arcs by two common tangent lines of the two arcs. A non-intersecting area of the first sport-field-shaped area that does not intersect the first area and the second area is included in the fourth area. For example, R1 is 4 km.

The fifth area includes areas of a second sport-field-shaped area surrounding the airport runway 200 that do not intersect the first sport-field-shaped area and the second area. The second sport-field-shaped area includes an area obtained by drawing two arcs with midpoints of the two ends of the airport runway 200 as centers of circles, respectively, and a second radius R2, and then connecting the two arcs by two common tangent lines of the two arcs. For example, R2 is 6 km.

Figure 3A:
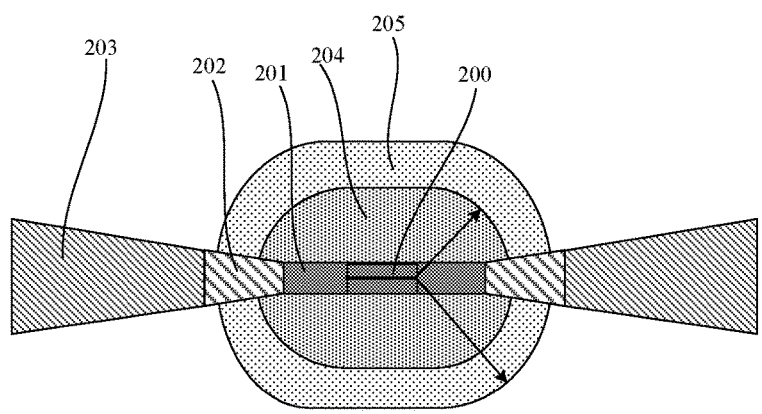
FIG. 3A to FIG. 3C are schematic diagrams showing various flight restriction levels and ranges of airports with various risk levels.
Figure 3B:
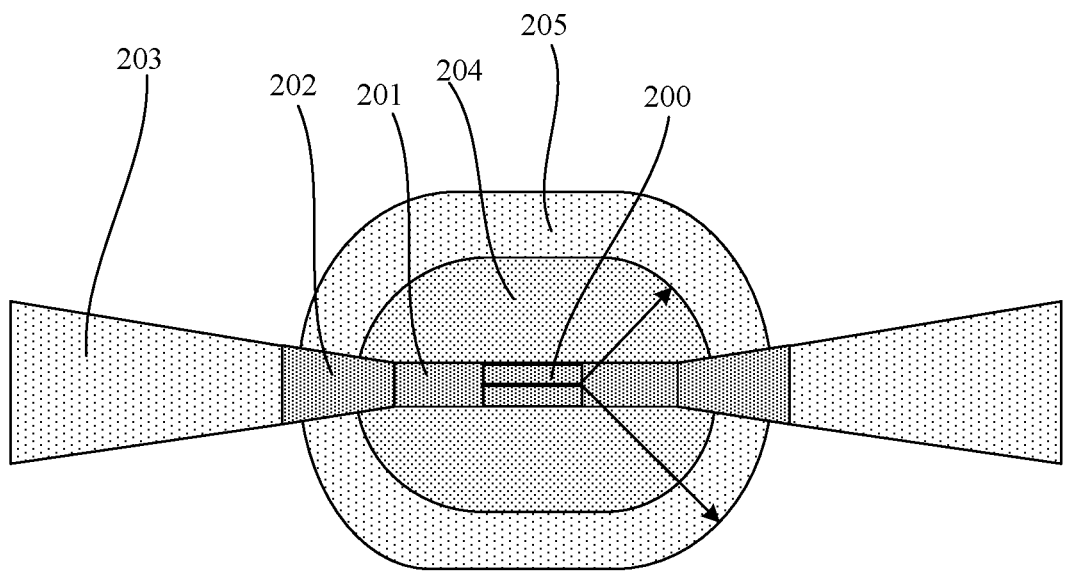
Figure 3C:
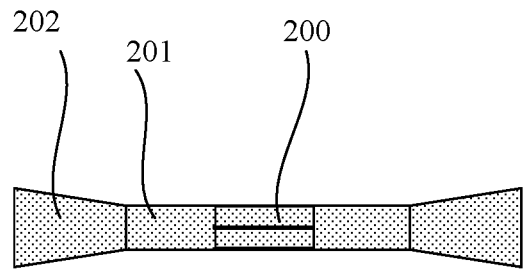

FIG. 3A to FIG. 3C are diagrams showing different flight restriction levels and ranges of airports with different risk levels.

FIG. 3A shows the flight restriction level and the range of the airport area when the risk level of the airport is high risk. As shown in FIG. 3A, when the risk level of the airport is high risk, the flight restriction levels and ranges of the first to fifth areas are as follows.

The first area is set as a no-fly zone, and the no-fly zone includes the first area and an airspace over the first area. That is, no UAV is permitted to fly in the first area.

The second area is set as an altitude-restricted zone, and the altitude-restricted zone includes an airspace over the second area with an altitude greater than a first set altitude threshold. For example, the first set altitude threshold is 60 m. That is, a flight altitude of a UAV in the second area cannot be higher than 60 m. The flight altitude of a UAV can be the flight altitude from the airport runway or from the take-off point of the UAV.

The third area is set as an altitude-restricted zone, and the altitude-restricted zone includes an airspace over the third area with an altitude greater than a second set altitude threshold. For example, the second set altitude threshold is 120 m. That is, the flight altitude of a UAV in the third area cannot be higher than 120 m. The flight altitude of a UAV can be the flight altitude from the airport runway or from the take-off point of the UAV.

The fourth area is set as an authorization zone, and the authorization zone includes the fourth area and an airspace over the fourth area. That is, obtaining an authorization or performing releasing is required for the flight of a UAV in the fourth area. A method to perform releasing will be described later.

The fifth area is set as an enhanced warning zone, and the enhanced warning zone includes the fifth area and an airspace over the fifth area. That is, a UAV may receive a risk alert when the UAV flies in the fifth area.

FIG. 3B shows the flight restriction level and the range of the airport area when the risk level of the airport is medium risk. As shown in FIG. 3B, when the risk level of the airport is medium risk, the flight restriction level and the range of the first to fifth areas are as follows.

The first area is set as an authorization zone, and the authorization zone includes the first area and the airspace over the first area. That is, obtaining an authorization or performing releasing is required for the flight of a UAV in the first area. The method to perform releasing will be described later.

The second area is set as an authorization zone, and the authorization zone includes the airspace over the second area. That is, obtaining an authorization or performing releasing is required for the flight of a UAV in the second area. The method to perform releasing will be described later.

The third area is set as a warning zone, and the warning zone includes the airspace over the third area. That is, a UAV may receive a risk alert when the UAV flies in the third area.

The fourth area is set up as an enhanced warning zone, and the enhanced warning zone includes the airspace over the fourth area. That is, a UAV may receive a risk alert when the UAV flies in the fourth area.

The fifth area is set as a warning zone, and the warning zone includes the fifth area and the airspace over the fifth area. That is, a UAV may receive a risk alert when the UAV flies in the fifth area.

FIG. 3C shows the flight restriction level and the range of the airport area when the risk level of the airport is medium risk. As shown in FIG. 3C, when the risk level of the airport is low risk, the flight restriction level and the range of the first to fifth areas are as follows.

The first area is set as an enhanced warning zone, and the enhanced warning zone includes the first area and the airspace over the first area. That is, a UAV may receive a risk alert when the UAV flies in the first area.

The second area is set as an enhanced warning zone, and the enhanced warning zone includes airspace over the second area. That is, a UAV may receive a risk alert when the UAV flies in the second area.

There is no flight restriction in the third area, the fourth area, and the fifth area.

According to the method for generating a flight restriction zone consistent with the embodiments of the present disclosure, because the flight restriction level and the range of the airport area are generated according to the risk level of the airport, the protection requirements of the airport operations and the using needs of the user can be fully considered, thereby solving the conflict between the protection of the airport operation and the use of a UAV to a certain extent, and improving the use of a UAV, which is conducive to the development of industry.

After a flight restriction zone is generated according to the method for generating a flight restriction zone consistent with the embodiments of the present disclosure, a UAV is required to perform a flight restriction strategy according to the flight restriction zone. Therefore, a method for controlling flight of a UAV is provided to realize the flight restriction strategy according to the present disclosure. The method for controlling the flight of a UAV provided is described with reference to FIG. 1B.

Figure 1B:
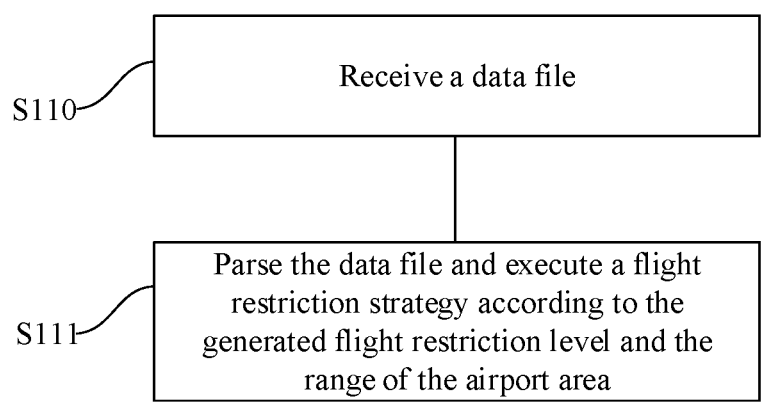
FIG. 1B is a schematic flow chart of a method for controlling flight of an unmanned aerial vehicle according to an example embodiment.

FIG. 1B is a schematic flow chart of a method for controlling flight of a UAV according to an example embodiment. The method includes following processes.

At S110, a data file is received, where the data file indicates a flight restriction level and the range of an airport area generated according to a risk level of the airport. The flight restriction level and the range of a same type of airport area can be different for airports with different risk levels.

At S111, the data file is parsed, and a flight restriction strategy is executed according to the generated flight restriction level and the range of the airport area.

The data file can be received in a plurality of manners as needed. In an example embodiment, the data file may first be downloaded from a server through a control device of a UAV, such as a remote control or a smart terminal, and then the UAV may receive the data file from the control device to import the data file into the UAV. For example, an application running on a smart terminal to control a UAV is connected to a server, downloads the data file from the server, and then uploads the data file to the UAV.

In another example embodiment, a UAV can receive the data file from a server through a direct communication with the server. For example, when a UAV communicates with a server via a mobile network or a Wi-Fi network, the data file is downloaded directly from the server to complete an import.

In some embodiments, when the data file is imported into a UAV, a flight controller of the UAV parses the data file and executes the flight restriction strategy according to the generated flight restriction level and the range of the airport area. That is, the flight restriction level and the range of a same type of airport area of the airport with a various risk level is various.

In some embodiments, the risk level of the airport includes high risk, medium risk, and low risk.

In some embodiments, the flight restriction level includes a warning zone, an enhanced warning zone, an authorization zone, an altitude-restricted zone, and a no-fly zone.

In some embodiments, the airport area includes a first area, and the first area includes the airport runway and the runway extensions.

In some embodiments, when the risk level of the airport is high risk, the first area is set as a no-fly zone, and the no-fly zone includes the first area and an airspace over the first area.

When the risk level of the airport is medium risk, the first area is set as an authorization zone, and the authorization zone includes the first area and the airspace over the first area.

When the risk level of the airport is low risk, the first area is set as an enhanced warning zone, and the enhanced warning zone includes the first area and the airspace over the first area.

In some embodiments, the runway extensions includes areas extending by a set distance from two ends of the airport runway along a direction of the airport runway.

In some embodiments, the airport area also includes a second area, and the second area includes first trapezoidal areas connected to two ends of the first area and extending along the direction of the airport runway.

In some embodiments, when the risk level of the airport is high risk, the second area is set as an altitude-restricted zone, and the altitude-restricted zone includes an airspace over the second area with an altitude greater than a first set altitude threshold.

When the risk level of the airport is medium risk, the second area is set as an authorization zone, and the authorization zone includes the second area and an airspace over the second area.

When the risk level of the airport is low risk, the second area is set as an enhanced warning zone, and the enhanced warning zone includes the second area and the airspace over the second area.

In some embodiments, the airport area also includes a third area, and the third area includes second trapezoidal areas connected to the second area and extending along the direction of the airport runway.

In some embodiments, when the risk level of the airport is high risk, the third area is set as an altitude-restricted zone, and the altitude-restricted zone includes an airspace over the third area with an altitude greater than a second set altitude threshold.

When the risk level of the airport is medium risk, the third area is set as a warning zone, and the warning zone includes the third area and an airspace over the third area.

When the risk level of the airport is low risk, there are no flight restriction in the third area.

In some embodiments, the second set altitude threshold is greater than the first set altitude threshold.

In some embodiments, the airport area also includes a fourth area, the fourth area includes a first sport-field-shaped area surrounding the airport runway and non-intersecting with the first area and the second area. The first sport-field-shaped area includes an area obtained by drawing two arcs with midpoints of two ends of the airport runway as centers of circles, respectively, and a first radius, and then connecting the two arcs by two common tangent lines of the two arcs.

In some embodiments, when the risk level of the airport is high risk, the fourth area is set as an authorization zone, and the authorization zone includes the fourth area and an airspace over the fourth area.

When the risk level of the airport is medium risk, the fourth area is set as an enhanced warning zone, and the enhanced warning zone includes the fourth area and the airspace over the fourth area.

When the risk level of the airport is medium to low risk, there is no flight restriction in the fourth area.

In some embodiments, the airport area also includes a fifth area, the fifth area includes areas of a second sport-field-shaped area surrounding the airport runway and that do not intersect the first sport-field-shaped area. The second sport-field-shaped area includes an area obtained by drawing two arcs with midpoints of the two ends of the airport runway as centers of circles, respectively, and a second radius, and then connecting the two arcs by two common tangent lines of the two arcs.

In some embodiments, when the risk level of the airport is high risk, the fifth area is set as an enhanced warning zone, and the enhanced warning zone includes the fifth area and an airspace over the fifth area.

When the risk level of the airport is medium risk, the fifth area is set as an enhanced warning zone, and the enhanced warning zone includes the fifth area and the airspace over the fifth area.

When the risk level of the airport is low risk, there is no flight restriction in the fifth area.

In some embodiments, the second radius is greater than the first radius.

In some embodiments, a set altitude threshold of the altitude-restricted zone is an altitude from a horizontal plane of the airport runway.

In some embodiments, a set altitude threshold of the altitude-restricted zone is an altitude from a take-off point of a UAV.

For the meaning of the above risk level of the airport, the specific setting of the airport area, and the flight restriction strategy under different flight restriction levels, references may be made to the above-described embodiments, which are omitted here.

As described above, when the flight restriction zone is an authorization zone, performing releasing on the authorization zone is required for the flight of a UAV in the authorization zone. A control method of a UAV consistent with embodiments of the present disclosure is provided to realize a release of the authorization zone. The control method of a UAV to realize a release of the authorization zone is described below with reference to FIG. 4.

Figure 4:
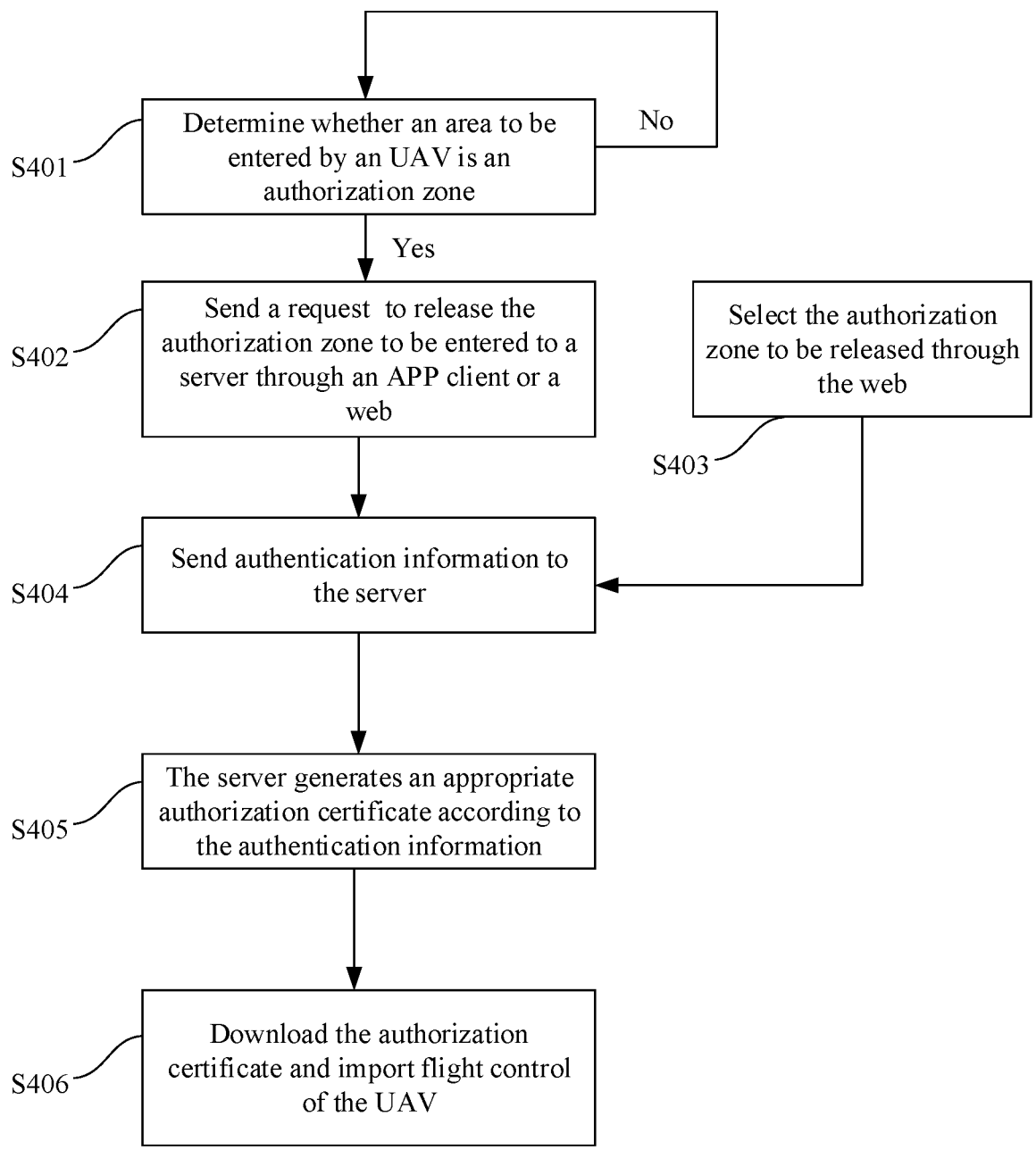
FIG. 4 is a schematic flow chart of a control method of an unmanned aerial vehicle according to an example embodiment.

FIG. 4 is a schematic flow chart of a control method of a UAV according to an example embodiment. As shown in FIG. 4, the control method of a UAV includes following processes.

At S401, whether an area to be entered by a UAV is an authorization zone is determined. If the area to be entered is an authorization zone, processes S402 to S406 are performed to release the authorization zone. If the area to be entered is not an authorization zone, process S401 is repeated.

At S402, a request to release the authorization zone to be entered is sent to a server through an APP client or a web.

At S404, authentication information is sent to the server.

At S405, the server generates an appropriate authorization certificate according to the authentication information. For example, the authorization certificate includes a server account number of a user, a serial number of a flight controller of the UAV, and an authorized flight period.

At S406, the authorization certificate is downloaded and imported through the APP client to the flight controller of the UAV.

The method to determine whether an area to be entered by a UAV is an authorization zone can include a manual determination method. For example, if a user prepares to fly a UAV in an authorization zone, it can be clearly determined that the area to be entered is an authorization zone. The method to determine whether an area to be entered by a UAV is an authorization zone can also include a method to determine whether an area to be entered is an authorization zone based on a current position of the UAV and locations of the flight restriction zones of various regions obtained by a flight controller of the UAV or a control device (e.g., a remote control or a mobile device communicatively connected to the UAV).

When the area to be entered is an authorization zone, an APP client installed on a mobile device (e.g., a smartphone or a tablet) communicatively connected to a UAV indicates that the UAV may enter an authorization zone and asks whether a release is required. The user can send a request to a server through the APP client to release the authorization zone to be entered. The user can also send the release request to the server in advance through the web for the authorization zone to be entered.

Further, before the user sends the release request to the server through the web to for the authorization zone to be entered, at S403, the authorization zone to be released is selected through the web. That is, the user logs in a system through the web to select the authorization zone (i.e., the flight authorization zone to be entered), and then sends the release request to the server through the web for the authorization zone, thereby realizing release in advance.

The user sends authentication information to the server through the APP client or the web, to facilitate the server to authenticate and create an authorization certificate. Sending the authentication information to the server allows the server to record information of the user using the UAV in the authorization zone, thereby facilitating the server to follow up in the event of an accident.

In some embodiments, the authentication information includes a mobile phone number or a credit card number.

According to the control method of a UAV consistent with the embodiments of the present disclosure, the UAV is enabled to obtain a right to enter an authorization zone by performing releasing in real time or in advance, which improves the convenience of the user under the premise of giving a reasonable warning to the user.

In addition, a device for generating a flight restriction zone consistent with the embodiments of the present disclosure is provided, which includes a memory storing one or more computer programs, and one or more processors configured to execute the one or more computer programs to implement the method for generating a flight restriction zone shown in FIG. 1 to FIG. 3C.

In some embodiments, the one or more processors are configured individually or jointly to execute the one or more computer programs to obtain a risk level of an airport, which is related to an airport type and an airport traffic volume, to generate a flight restriction level and the range of an airport area according to the risk level of the airport, where the flight restriction level and the range of a same type of airport area is different for airports with different risk levels, and to create a data file indicating the flight restriction level and the range of the airport.

In addition, a device for controlling flight of a UAV consistent with the embodiments of the present disclosure is also provided, which includes a memory storing one or more computer programs, and one or more processors configured to execute the one or more programs to implement the method for controlling flight of a UAV shown in FIG. 1B.

In some embodiments, the one or more processors are configured individually or jointly to execute the one or more programs to receive a data file indicating a flight restriction level and the range of an airport area generated according to a risk level of an airport, where the flight restriction level and the range of a same type of airport area is different for airports with different risk levels, and to parse the data file and control the UAV to execute a flight restriction strategy according to the generated flight restriction level and the range of the airport area.

In addition, a control device for a UAV consistent with the embodiments of the present disclosure is also provided, which includes a memory storing one or more computer programs, and one or more processors configured to execute the one or more programs to implement the control method for a UAV shown in FIG. 4.

In some embodiments, the one or more processors are configured individually or jointly to execute the one or more programs to release an authorization zone if the area to be entered by the UAV is the authorization zone.

For releasing an authorization zone, the one or more processors are configured individually or jointly to execute the one or more programs to send a request to release of the authorization zone to be entered to a server through an APP client or a web, to send authentication information to the server, to download an authorization certificate through the APP client and import the authorization certificate into a flight controller of the UAV after the server generates a corresponding authorization certificate according to the authentication information.

Although the above has shown and described the embodiments of the present disclosure, it is intended that the above embodiments be considered as examples only and not to limit the scope of the present disclosure. One of ordinary skill in the art can make changes, modifications, replacements, and transformation to the above embodiments within the scope of the present disclosure.

Those of ordinary skill in the art will appreciate that the example units and algorithm processes described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

The disclosed systems, devices, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed.

In the description, a large number of specific details are given to provide a more thorough understanding of the present disclosure. It will be appreciated to those skilled in the art that the present disclosure can be implemented without one or more of these details. In some examples, to avoid confusion with the present disclosure, some technical features known by those skilled in the art are not described. The present disclosure can be implemented in different forms and should not be limited to the embodiments below.

Similarly, to streamline the present disclosure and help to understand one or more of the aspects of the disclosure, in the description of the example embodiments of the present disclosure, the characteristics of the present disclosure are sometimes grouped together into a single embodiment, diagram, or description of the characteristics. However, the method of the present disclosure should not be understood as reflecting the intention, that is, the requirements for protection of the present disclosure require more features than those in each claim. As reflected in the corresponding claim, a point of the disclosure is that a corresponding technical problem can be solved with fewer characteristics than all the characteristics of a single embodiment consistent with the disclosure. Therefore, a claim to follow a specific embodiment is explicitly included in the specific embodiment, where each claim itself as a separate embodiment of the present disclosure.

Those skilled in the art can understand that, in addition to the mutual exclusion between features, any combination may be used to combine all features disclosed in this specification (including accompanying claims, abstracts, and drawings) and all processes or units of any method or devices disclosed. Unless otherwise specified, each feature disclosed in this specification (including accompanying claims, abstract, and drawings) may be replaced by alternative features to provide the same, equivalent, or similar purpose.

In addition, those skilled in the art can understand that, although some embodiments described above include certain characteristics included in other embodiments rather than other characteristics, the combination of characteristics of different embodiments are within the scope of the present disclosure and form different embodiments. For example, any one embodiment requires protection in the claims can be used in any combination.

The various components consistent with the embodiments of the disclosure may be implemented by hardware, or software modules running on one or more processors, or their combination. Those skilled in the art should understand that microprocessors or digital signal processors (DSPs) can be used in practice to achieve some or all of the functions of some modules according to the embodiments of the present disclosure. The disclosure may also be implemented as a part or all of a device program (e.g., a computer program or a computer program product) to be executed to achieve the method described above. The program may be stored on a computer-readable medium or in a form including one or more signals. The one or more signals can be downloaded from an Internet site, or be available on one or more carrier signals, or be in any other form.

The embodiments of the present disclosure are described above, it is intended that the above embodiments be considered as examples only and not to limit the scope of the present disclosure. The disclosure may be achieved by a manner of a hardware including several different components and by a manner of a computer with appropriate programming. The relational terms, such as "first," "second," "third," "fourth," and "fifth" are only used to distinguish one entity or operation from another entity or operation, which may not indicate or imply any such actual relationship or order between the entities or operations.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the disclosure being indicated by the following claims.

What is claimed is:

1. A method for controlling an aerial vehicle comprising:
   receiving a data file indicating a flight restriction level and a range of an airport area in an airport, the flight restriction level of the airport area being determined based at least on a risk level of the airport, and the risk level of the airport being determined based at least on an airport traffic volume of the airport;
   parsing the data file to obtain the flight restriction level and the range of the airport area; and
   controlling the aerial vehicle to execute a flight restriction strategy according to the flight restriction level and the range of the airport area;
   wherein:
     the airport area includes an airport runway and a runway extension;
     the airport runway and the runway extension form a first area of the airport area;
     the airport area further includes a second area, the second area including a trapezoidal area connected to an end of the first area and extending along an extension direction of the airport runway; and
     the trapezoidal area is an isosceles-trapezoidal area with a midline parallel to the extension direction of the airport runway.

2. A device for controlling an aerial vehicle comprising:
a memory storing a computer program; and
a processor configured to execute the computer program to:
  receive a data file indicating a flight restriction level and a range of an airport area in an airport, the flight restriction level of the airport area being determined based at least on a risk level of the airport, and the risk level of the airport being determined based on an airport traffic volume of the airport;
  parse the data file to obtain the flight restriction level and the range of the airport area; and
  control the aerial vehicle to execute a flight restriction strategy according to the flight restriction level and the range of the airport area;
wherein:
  the airport area includes an airport runway and a runway extension;
  the airport runway and the runway extension form a first area of the airport area;
  the airport area further includes a second area, the second area including a trapezoidal area connected to an end of the first area and extending along an extension direction of the airport runway; and
  the trapezoidal area is an isosceles-trapezoidal area with a midline parallel to the extension direction of the airport runway.

3. The device of claim 2, wherein the flight restriction level includes warning, enhanced warning, authorization, altitude-restricted, or no-fly.

4. The device of claim 2, wherein:
in response to the risk level of the airport being high risk, the first area is set as a no-fly zone including the first area and an airspace over the first area;
in response to the risk level of the airport being medium risk, the first area is set as an authorization zone including the first area and the airspace over the first area; and
in response to the risk level of the airport being low risk, the first area is set as an enhanced warning zone including the first area and the airspace over the first area.

5. The device of claim 2, wherein the runway extension includes an area extending from an end of the airport runway outwards by a set distance along au extension direction of the airport runway, and the set distance being the same as an extending length of the airport runway.

6. The device of claim 2, wherein:
in response to the risk level of the airport being high risk, the second area is set as an altitude-restricted zone including an airspace over the second area with an altitude greater than an altitude threshold;
in response to the risk level of the airport being medium risk, the second area is set as an authorization zone including the second area and the airspace over the second area; and
in response to the risk level of the airport being low risk, the second area is set as an enhanced warning zone including the second area and the airspace over the second area.

7. The device of claim 6, wherein:
the trapezoidal area is a first trapezoidal area; and
the airport area further includes a third area, the third area including a second trapezoidal area connected to the second area and extending along the extension direction of the airport runway.

8. The device of claim 7, wherein:
the altitude-restricted zone is a first altitude-restricted zone and the altitude threshold is a first altitude threshold;
in response to the risk level of the airport being high risk, the third area is set as a second altitude-restricted zone including an airspace over the third area with an altitude greater than a second altitude threshold, the second altitude threshold being greater than the first altitude threshold;
in response to the risk level of the airport being medium risk, the third area is set as a warning zone including the third area and the airspace over the third area; and
in response to the risk level of the airport being low risk, the third area is set as a zone with no flight restriction.

9. The device of claim 7, wherein the airport area further includes a fourth area, the fourth area including a non-intersecting area of a sport-field-shaped area surrounding the airport runway that does not intersect the first area and the second area, and the sport-field-shaped area including an area obtained by:
  drawing two arcs with midpoints of two ends of the airport runway as circle centers, respectively, and a radius, and
  connecting the two arcs by two common tangent lines of the two arcs.

10. The device of claim 9, wherein:
the authorization zone is a first authorization zone and the enhanced warning zone is a first enhanced warning zone;
in response to the risk level of the airport being high risk, the fourth area is set as a second authorization zone including the fourth area and an airspace over the fourth area:
in response to the risk level of the airport being medium risk, the fourth area is set as a second enhanced warning zone including the fourth area and the airspace over the fourth area; and
in response to the risk level of the airport being low risk, the fourth area is set as a zone with no flight restriction.

11. The device of claim 9, wherein:
the sport-field-shaped area is a first sport-field-shaped area, the non-intersecting area is a first non-intersecting area, the radius is a first radius, and the two arcs are two first arcs; and
the airport area further includes a fifth area, the fifth area including a second non-intersecting area of a second sport-field-shaped area surrounding the airport runway that does not intersect the first sport-field-shaped area and the second area, and the second sport-field-shaped area including an area obtained by:
  drawing two second arcs with the midpoints of the two ends of the airport runway as circle centers, respectively, and a second radius, and
  connecting the two second arcs by two common tangent lines of the two second arcs, the second radius being greater than the first radius.

12. The device of claim 11, wherein:
the enhanced warning zone is a first enhanced warning zone;
in response to the risk level of the airport being high risk, the fifth area is set as a second enhanced warning zone including the fifth area and an airspace over the fifth area;
in response to the risk level of the airport being medium risk, the fifth area is set as a warning zone including the fifth area and the airspace over the fifth area; and in response to the risk level of the airport being low risk, the fifth area is set as a zone with no flight restriction.

13. The device of claim 2, wherein:
the airport is a first airport; and
the data file further indicates a flight restriction level and a range of an airport area in a second airport generated according to a risk level of the second airport, the risk level of the first airport being different from the risk level of the second airport, the flight restriction level of the airport area of the first airport being different from the flight restriction level of the airport area of the second airport, and a type of the airport area of the first airport being same as a type of the airport area of the second airport.

14. The device of claim 2, wherein:
the airport area further includes a third area, a fourth area, and a fifth area;
the third area includes a second trapezoidal area connected to the second area and extending along the extension direction of the airport runway;
the fourth area includes a first non-intersecting area of a first sport-field-shaped area surrounding the airport runway that does not intersect the first area and the second area, and the first sport-field-shaped area including an area obtained by drawing two first arcs with midpoints of two ends of the airport runway as circle centers, respectively, and a first radius, and connecting the two first arcs by two common tangent lines of the two first arcs;
the fifth area includes a second non-intersecting area of a second sport-field-shaped area surrounding the airport runway that does not intersect the first sport-field-shaped area and the second area, and the second sport-field-shaped area including an area obtained by drawing two second arcs with the midpoints of the two ends of the airport runway as circle centers, respectively, and a second radius, and connecting the two second arcs by two common tangent lines of the two second arcs; and
in response to the risk level of the airport being high risk:
the first area is set as a no-fly zone including the first area and an airspace over the first area;
the second area is set as a first altitude-restricted zone including an airspace over the second area with an altitude greater than a first altitude threshold;
the third area is set as a second altitude-restricted zone including an airspace over the third area with an altitude greater than a second altitude threshold;
the fourth area is set as an authorization zone including the fourth area and an airspace over the fourth area; and
the fifth area is set as an enhanced warning zone including the fifth area and an airspace over the fifth area.

15. The device of claim 2, wherein:
the airport area further includes a third area, a fourth area, and a fifth area;
the third area includes a second trapezoidal area connected to the second area and extending along the extension direction of the airport runway;
the fourth area includes a first non-intersecting area of a first sport-field-shaped area surrounding the airport runway that does not intersect the first area and the second area, and the first sport-field-shaped area including an area obtained by drawing two first arcs with midpoints of two ends of the airport runway as circle centers, respectively, and a first radius, and connecting the two first arcs by two common tangent lines of the two first arcs;
the fifth area includes a second non-intersecting area of a second sport-field-shaped area surrounding the airport runway that does not intersect the first sport-field-shaped area and the second area, and the second sport-field-shaped area including an area obtained by drawing two second arcs with the midpoints of the two ends of the airport runway as circle centers, respectively, and a second radius, and connecting the two second arcs by two common tangent lines of the two second arcs; and
in response to the risk level of the airport being medium risk:
the first area is set as a first authorization zone including the first area and an airspace over the first area;
the second area is set as a second authorization zone including the second area and an airspace over the second area;
the third area is set as a first warning zone including the third area and an airspace over the third area;
the fourth area is set as an enhanced warning zone including the fourth area and an airspace over the fourth area; and
the fifth area is set as a second warning zone including the fifth area and an airspace over the fifth area.

16. The device of claim 2, wherein:
in response to the risk level of the airport being low risk:
the first area is set as a first enhanced warning zone including the first area and an airspace over the first area; and
the second area is set as a second enhanced warning zone including the second area and an airspace over the second area.

17. A method comprising:
obtaining a risk level of an airport, the risk level of the airport being determined based at least on an airport traffic volume of the airport;
generating a flight restriction level and a range of an airport area in the airport based at least on the risk level of the airport;
generating a data file indicating the generated flight restriction level and the range of the airport area; and
controlling an aerial vehicle to execute a flight restriction strategy according to the data file;
wherein:
the airport area includes an airport runway and a runway extension;
the airport runway and the runway extension form a first area of the airport area;
the airport area further includes a second area, the second area including a trapezoidal area connected to an end of the first area and extending along an extension direction of the airport runway; and
the trapezoidal area is an isosceles-trapezoidal area with a midline parallel to the extension direction of the airport runway.

* * * * *